United States Patent Office 3,320,296
Patented May 16, 1967

---

3,320,296
METHOD FOR PREPARATION OF COMPOUNDS WITH THE FORMULA $R_2Al$—$N(CH_3)_2$
Neil R. Fetter, Arlington, Calif., and Bodo K. W. Bartocha, Indian Head, Md., assignors to the United States of America as represented by the Secretary of the Navy
No Drawing. Filed Aug. 23, 1962, Ser. No. 219,078
5 Claims. (Cl. 260—448)

The invention described herein may be manufactured and used by or for the Government of the United States of America for governmental purposes without the payment of any royalties thereon or therefor.

This invention relates to a new method for the synthesis of compounds with the general formula $R_2AL$—$N(CH_3)_2$ where R may be hydrogen or an alkyl group such as methyl or ethyl by reacting tetramethyltetrazene with aluminimum hydride and aluminum alkyls.

Other methods have been employed in preparing similar compounds as is shown by the following equations:

(a) $R_3Al + HN(CH_3)_2 \rightarrow R_2Al$—$N(CH_3)_2 + RH$
    (wherein $R=CH_3; C_2H_5$)
(b) $LiAlH_4 + HN(CH_3)_2 \cdot HCl \rightarrow LiCl$
    $+ H_2Al$—$N(CH_3)_2 + 2H_2$
(c) $H_2Al$—$N(CH_3)_2 + 2RLi \rightarrow R_2Al$—$N(CH_3)_2 + 2LiH$
    (wherein $R=C_4H_9; C_6H_{11}$)

Method (a) requires high reaction temperature; method (b) is restricted to the compounds $H_2Al$—$N(CH_3)_2$ and $(CH_3)_2Al$—$N(CH_3)_2$; and method (c) is restricted to the availability of the RLi compounds.

This invention contemplates a unique and simple method for synthesizing in greater quantity and under milder conditions compounds having the formula $$R_2Al\text{—}N(CH_3)_2$$

wherein R may be either hydrogen or an alkyl group.

An object of the present invention is to provide a simple process for preparing aluminum-containing compositions which will have use as propellant additives.

Another object is to provide a process for synthesizing aluminum-containing compounds from the reaction of tetramethyltetrazene with aluminum hydride and aluminum alkyls which will have use as rocket fuels and components for explosives.

In accordance with the present invention compounds of the general formula $R_2Al$—$N(CH_3)_2$ where R may be hydrogen or an alkyl group were synthesized by the reaction of the tetramethyltetrazene with aluminum hydride and aluminum alkyls. The reaction was accomplished by adding the tetramethyltetrazene to aluminum hydride and aluminum alkyls at temperatures ranging from $-146°$ to $-196°$ C. The mixture is allowed to warm to room temperature (approximately $25°$ C.) and then heated at temperatures ranging from $55°$ C. to $90°$ C. for periods ranging from 6 to 18 hours. The mixture is then vacuum distilled to produce a product which needs no further purification.

The following examples serve to illustrate how the present invention may be carried out in practice; however, the invention is not restricted to the examples.

EXAMPLE I

*Tetramethyltetrazene and aluminum hydride trimethylamine*

By means of vacuum transfer, 0.0207 mole of tetramethyltetrazene were distilled onto 0.0219 mole of freshly sublimed aluminum hydride trimethylamine at $-196°$ C. The mixture was allowed to warm to room temperature (approximately $25°$ C.) and then heated at $65°$ C. for 6 hours. Any excess tetramethyltetrazene was removed by pumping at room temperature for one hour. A quantitive yield of a white crystalline solid requiring no further purification was obtained having a melting point of $89°–91°$ C.

The reaction may be represented by the following unbalanced equation:

$H_3Al:N(CH_3)_3 + (CH_3)_2NN=NN(CH_3)_2 \rightarrow$
$\quad H_2Al$—$N(CH_3)_2 + N_2 + N(CH_3)_3 + H_2$ The following elemental analysis of the product agrees with the formula $H_2Al$—$N(CH_3)_2$.

Calculated: C=32.87%; H=11.03%; N=19.17%; Al=36.92%. Found: C=32.08%; H=10.72%; N=19.32%; Al=37.37%.

EXAMPLE II

*Tetramethyltetrazene and trimethylaluminum trimethylamine*

By means of vacuum transfer, 0.0133 mole of tetramethyltetrazene were distilled onto 0.0136 mole of trimethylaluminum trimethylamine at $-196°$ C. The mixture was allowed to warm to room temperature, then heated at $90°$ C. for 10 hours. The product was vacuum sublimed (0.05 mm. Hg) at $30°$ C. three times to obtain a white crystalline solid with a melting point of $151°–153°$ C.

The reaction may be represented by the following unbalanced equation:

$(CH_3)_3Al:N(CH_3)_3 + (CH_3)_2NN=NN(CH_3)_2 \rightarrow$
$\quad (CH_3)_2Al$—$N(CH_3)_2 + N_2 + N(CH_3)_3 + CH_4$ The following elemental analysis agrees with the formula $(CH_3)_2Al$—$N(CH_3)_2$.

Calculated: C=47.50%; H=11.97%; Al=26.68%; N=13.85%. Found: C=46.72%; H=11.59%; Al=25.79%; N=18.42%.

Melting point=147–149° C.

The yield was approximately 50 mole percent based on trimethylaluminum trimethylamine, $(CH_3)_3Al:N(CH_3)_3$.

EXAMPLE III

*Triethylaluminum and tetramethyltetrazene*

With 25 ml. of pentane as a solvent, 0.0168 mole of tetramethyltetrazene (98%) was vacuum distilled at (0.005 mm. Hg) onto 0.0170 mole of triethylaluminum at $-146°$ C. The mixture was allowed to warm to room temperature and then it was heated at $55°$ C. for 18 hours. The pentane was then pumped off at room temperature and the remaining material vacuum distilled (0.005 mm. Hg) at $90°$ C. producing a white crystalline solid.

The reaction may be represented by the following unbalanced equation:

$(C_2H_5)Al + (CH_3)_2NN=NN(CH_3)_2 \rightarrow$
$\quad (C_2H_5)_2Al$—$N(CH_3)_2 + C_2H_6 + N_2$ An elemental analysis gave the following results which agree with the formula $(C_2H_5)_2Al$—$N(CH_3)_2$.

Calculated: C=55.79%; H=12.49%; N=10.84%; Al=20.88%. Found: C=56.64%; H=12.73%; N=11.64%; Al=20.76%.

The yield of $(C_2H)_2Al$—$N(CH_3)_2$ was approximately 75 mole percent based on triethylaluminum, $(C_2H_5)_3Al$.

The preparation of $H_2Al$—$N(CH_3)_2$ is quantitative and requires no further purification. Also high yield of $(C_2H_5)_2Al$—$N(CH_3)_2$ is obtained and the reaction may be run under mild conditions. This is an important advantage over other methods and is of greater importance when working with high aluminumalkyls such as bi-isobutyl aluminum hydride, tri-isobutyl aluminum, etc.

EXAMPLE IV

*Tetramethyltetrazene and bi-isobutyl aluminum hydride*

1.151 grams (9.90 mmoles) of tetramethyltetrazene were distilled onto 0.973 grams (6.87 mmoles) of bi-isobutyl aluminum hydride at −196° C. The mixture was allowed to warm to room temperature (approximately 25° C.) and then heated at 85°–90° C. for 2 hours. The reaction may be represented as follows:

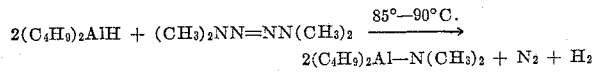

$$2(C_4H_9)_2AlH + (CH_3)_2NN=NN(CH_3)_2 \xrightarrow{85°-90°C.} 2(C_4H_9)_2Al-N(CH_3)_2 + N_2 + H_2$$

Elemental analysis of the product gave the following results.

Calculated: C=64.81%; H=12.78%; N=7.57%; Al=15.19%. Found: C=64.61%; H=13.06%; N=7.56%; Al=14.56%.

This reaction works equally well with or without a hydrocarbon solvent such as n-heptane.

Various modifications are contemplated and may obviously be resorted to by those skilled in the art without departing from the spirit and scope of the invention as set forth in the appended claims.

What is claimed is:

1. A process for the synthesis of compounds with the general formula $R_2Al-N(CH_3)_2$ where R is a member from the group consisting of hydrogen and lower alkyl radicals, comprising distilling about one mole tetramethyltetrazene onto about one mole a member selected from the group comprising aluminum hydride trimethylamine, trimethylaluminum trimethylamine, triethylaluminum and bi-isobutyl aluminum hydride at temperatures ranging from −146° C. to −196° C., slowly warming the resulting mixture to room temperature then heating for from 6 to 18 hours at temperatures ranging from 55° C. to 90° C., and vacuum distilling whereby a white crystalline compound is obtained.

2. A process for synthesizing a compound with the formula $H_2Al-N(CH_3)_2$ comprising adding about one mole tetramethyltetrazene to about one mole freshly sublimed aluminum hydride trimethylamine in a reaction medium at a temperature of −196° C., warming to room temperature, and heating for 6 hours at 65° C.

3. A process for the synthesis of the compound having the formula $(CH_3)_2Al-N(CH_3)_2$ comprising adding about one mole of tetramethyltetrazene to about one mole of trimethylaluminum trimethylamine in a reaction medium at a temperature of −196° C., warming to 25° C., then heating at 90° C. for about 10 hours, and vacuum subliming three times at 30° C., whereby a white crystalline compound is obtained having a melting point of 151°–153° C.

4. A process for synthesizing a compound having the formula, $(C_2H_5)_2Al-N(CH_3)_2$ comprising adding tetramethyltetrazene dissolved in pentane to triethylaluminum in a reaction medium at a temperature of −146° C., allowing to warm to room temperature then heating for 18 hours at 55° C., and finally vacuum distilling at 90° C. whereby a white crystalline compound is obtained.

5. A process for synthesizing a compound having the formula, $(C_4H_9)_2Al-N(CH_3)_2$ comprising
   distilling tetramethyltetrazene onto bi-isobutyl aluminum hydride at a temperature of about −196° C. to form a mixture;
   warming the mixture to room temperature; and
   heating said mixture for two hours at temperatures ranging from 85° C. to 90° C., whereby a white crystalline compound is obtained.

References Cited by the Examiner

Davidson et al., JACS, vol. 64, pages 316–324 (1942).
Erusalimskii et al., Chemical Abstracts, vol. 51, page 12841e (1947).

HELEN M. McCARTHY, *Primary Examiner.*

ABRAHAM H. WINKELSTEIN, TOBIAS E. LEVOW,
*Examiners.*

I. R. PELLMAN, H. M. S. SNEED, *Assistant Examiners.*